(12) United States Patent
Yamagajo et al.

(10) Patent No.: US 7,486,192 B2
(45) Date of Patent: Feb. 3, 2009

(54) RFID TAG WITH FREQUENCY ADJUSTING PORTION

(75) Inventors: Takashi Yamagajo, Kawasaki (JP); Toru Maniwa, Kawasaki (JP); Manabu Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 225 days.

(21) Appl. No.: 11/438,368

(22) Filed: May 23, 2006

(65) Prior Publication Data

US 2007/0200705 A1 Aug. 30, 2007

(30) Foreign Application Priority Data

Feb. 24, 2006 (JP) .............................. 2006-049306

(51) Int. Cl.
*G08B 13/14* (2006.01)
(52) U.S. Cl. .............. 340/572.7; 340/572.5; 340/572.8; 343/868; 343/748
(58) Field of Classification Search ................ 343/745, 343/748, 868; 340/572.1, 572.5, 572.4, 572.7, 340/572.8; 455/13.3
See application file for complete search history.

(56) References Cited

U.S. PATENT DOCUMENTS

| | | | | |
|---|---|---|---|---|
| 4,697,189 A | | 9/1987 | Ness | |
| 5,337,063 A | * | 8/1994 | Takahira | 343/741 |
| 6,028,564 A | * | 2/2000 | Duan et al. | 343/818 |
| 6,097,347 A | * | 8/2000 | Duan et al. | 343/802 |
| 6,480,110 B2 | * | 11/2002 | Lee et al. | 340/572.5 |
| 6,744,366 B2 | * | 6/2004 | How | 340/571 |
| 7,202,790 B2 | * | 4/2007 | Copeland et al. | 340/572.7 |
| 7,323,977 B2 | * | 1/2008 | Kodukula et al. | 340/505 |
| 2002/0003496 A1 | * | 1/2002 | Brady et al. | 343/700 MS |
| 2005/0057424 A1 | | 3/2005 | Kukko et al. | |
| 2006/0082444 A1 | * | 4/2006 | Sweeney et al. | 340/10.3 |
| 2008/0111745 A1 | * | 5/2008 | Takada et al. | 343/700 MS |

FOREIGN PATENT DOCUMENTS

JP  2000-235635 A  8/2000
JP  2001-010264 A  1/2001

* cited by examiner

*Primary Examiner*—George A Bugg
*Assistant Examiner*—Hoi C Lau
(74) *Attorney, Agent, or Firm*—Hanify & King, P.C.

(57) ABSTRACT

A radio frequency identification tag includes an antenna including a conductor pattern in a form of dipole, and connected to an integrated circuit chip of the radio frequency identification tag; an adjusting portion including at least one adjusting pattern connected to the conductor pattern to make the antenna compatible with an environment in which the antenna is used; and a marking portion at which directions for an adjusting operation using the adjusting portion is indicated.

12 Claims, 12 Drawing Sheets

RFID TAG WITH FREQUENCY ADJUSTING PORTION

CROSS-REFERENCE TO RELATED APPLICATIONS

This application is based upon and claims the benefit of priority from the prior Japanese Patent Application No. 2006-049306, filed on Feb. 24, 2006, the entire contents of which are incorporated herein by reference.

BACKGROUND OF THE INVENTION

1. Field of the Invention

The present invention relates to a radio frequency identification (RFID) tag.

2. Description of the Related Art

Conventionally, at a frequency, for example, 13 megahertz (MHz) band, used for a radio tag, an antenna has a predetermined impedance, for example, 50 ohms (Ω), and it is relatively easy to be matched with an integrated circuit (IC). A coil antenna is used in such radio tag, to transmit and receive information by electromagnetic induction between a transmitter/receiver that is positioned at a short distance from the radio tag.

As a technique for adjusting a resonant frequency in a low-frequency band, an IC card is known in which a resonant circuit is formed with a coil antenna and a patterned capacitor. Capacitance of a capacitor is adjusted by cutting the capacitor pattern, thereby adjusting the resonant frequency (for example, Japanese Patent Laid-Open Publication No. 2000-235635).

Moreover, a non-contact type IC card is known in which a resonant circuit is formed with a coil antenna and an adjustment resistor. A resistance of the adjustment resistor is adjusted by cutting the adjustment register. By adjusting the adjustment resistor, sharpness of resonance Q of the resonant circuit can be adjusted. An adjustment capacitor may be provided, and by cutting the adjustment capacitor, resonant frequency f can be also adjusted (for example, Japanese Patent Laid-Open Publication No. 2001-10264).

In an RFID tag using a high frequency, a radio wave is transmitted and received between a dipole antenna and an antenna in a transmitter/receiver positioned at relatively long distance from the RFID tag. In such RFID tag, because impedance of an IC varies, a different design from a conventional design is required to match with the antenna. The RFID tag is likely to change characteristics thereof depending on use environments, such as a used frequency, an area, and a material to which the RFID tag is attached.

As a technique of matching an antenna and an IC in a high-frequency band, an antenna having two loading bars formed in a straight line in a dipole form and a stub is used. Since an antenna pattern itself has an inductance component, it is possible to change the impedance characteristic by selecting a loading bar and by cutting a stub being an adjustment part (for example, U.S. Pat. No. 6,028,564).

According to the above conventional techniques, a resonant frequency can be adjusted by cutting the capacitor pattern or the adjustment capacitor, or by cutting the antenna pattern. However, how much adjustment can be achieved when how much these cutting parts are cut is unclear.

Due to this, effectiveness of adjustment cannot be grasped until an adjustment operation, such as cutting of the pattern, is actually performed. Therefore, it takes a long time for the adjustment. In addition, unnecessary operations can be repeated in trial and error, and efficiency in the adjustment operation cannot be improved and cost for the adjustment increases.

Since an RFID tag uses high-frequency band (900 MHz band, or 2.45 Gigahertz (GHz) band), match between an antenna and an IC is particularly important.

The techniques disclosed in Japanese Patent Laid-Open Publication No. 2000-235635 and Japanese Patent Laid-Open Publication No. 2001-10264 are for a low-frequency band (13 MHz band) in which information is transmitted and received by electromagnetic induction using a coil antenna with a transmitter/receiver positioned at a relatively short distance from the radio tag. In the RFID tag using a high frequency band, a dipole antenna is used, therefore, the techniques for a low-frequency band cannot be applied.

A technique disclosed in U.S. Pat. No. 6,028,564 is for a high-frequency band in which a dipole antenna is used. However, how a loading bar is selected, and how much adjustment can be achieved when how much of the stub is cut are unclear.

SUMMARY OF THE INVENTION

It is an object of the present invention to at least solve the above problems in the conventional technologies.

A radio frequency identification tag according to one aspect of the present invention includes an antenna including a conductor pattern in a form of dipole, and connected to an integrated circuit chip of the radio frequency identification tag; an adjusting portion including at least one adjusting pattern connected to the conductor pattern to make the antenna compatible with an environment in which the antenna is used; and a marking portion at which directions for an adjusting operation using the adjusting portion is indicated.

A radio frequency identification tag according to another aspect of the present invention includes an antenna including a conductor pattern in a form of dipole, and connected to an integrated circuit chip of the radio frequency identification tag; an adjusting portion including an adjusting pattern having an inductance component corresponding to a length of the adjusting pattern, and connected to the integrated circuit chip in parallel with the antenna; and a marking portion at which directions for an adjusting operation using the adjusting portion is indicated. Inductance of the antenna is changed by changing the length of the adjusting pattern.

A radio frequency identification tag according to still another aspect of the present invention includes an antenna including a conductor pattern in a form of dipole, and connected to an integrated circuit chip of the radio frequency identification tag; a first adjusting portion including a plurality of folding points at which the conductor pattern is folded; a second adjusting portion including an adjusting pattern having an inductance component corresponding to a length of the adjusting pattern, and connected to the integrated circuit chip in parallel with the antenna; a first marking portion at which directions for an adjusting operation using the first adjusting portion is indicated; and a second marking portion at which directions for an adjusting operation using the second adjusting portion is indicated. Gain of the antenna is changed by changing the folding points, and inductance of the antenna is changed by changing the length of the adjusting pattern.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained below in detail with reference to the accompanying drawings.

Figure 1:
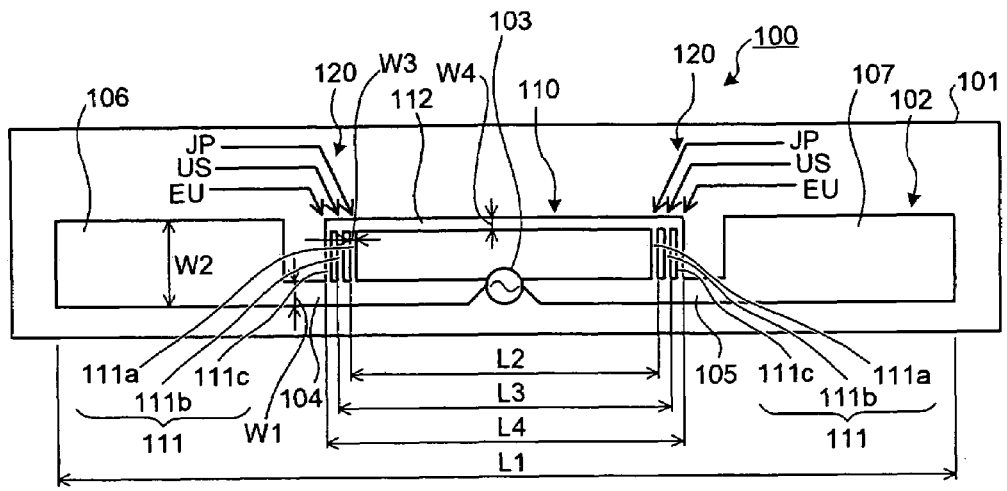
FIG. 1 is a schematic of an RFID tag according to a first embodiment of the present invention.

FIG. 1 is a schematic of an RFID tag according to a first embodiment of the present invention. An RFID tag 100 includes a tag antenna 102 formed on a film base 101. For the film base 101, material such as Polyethylene terephthalate (PET) resin, a dielectric substrate, and acrylonitrile butadiene styrenean (ABS) resin is used. This film base 101 may be configured to have a flexible structure.

The tag antenna 102 is formed in a compact size so that an antenna length is smaller than $\lambda/2$ where an antenna resonance wavelength is $\lambda$, and forms equivalently a minute dipole antenna. The tag antenna 102 is formed with a material such as copper and silver, in a pattern on the film base 101. This tag antenna 102 has a power feed point at substantially center and an IC 103 is provided as a tag chip at this power feed point. A pair of connecting terminals of the IC 103 is respectively connected to antenna patterns 104 and 105 formed in substantially straight lines, stretching in opposite directions from the IC 103.

The antenna patterns 104 and 105 have gain adjusting portions 106 and 107 respectively. The gain adjusting portions 106 and 107 are formed such that each end has wider line width to have larger area. An antenna gain can be enhanced by the gain adjusting portions 106 and 107.

A matching portion 110 formed in a loop shape is formed between the antenna patterns 104 and 105. The matching portion 110 includes a pair of derived portions 111 respectively derived from a portion of the antenna patterns 104 and 105 at which the IC 103 is disposed, and a connecting portion 112 connecting between the derived portions 111, so that the matching portion 110 has a specific length. The matching portion 110 is connected to the IC 103 in parallel with the antenna patterns 104 and 105.

The matching portion 110 has an inductance component of a predetermined length for adjusting the admittance of the tag antenna 102 in order to match the tag antenna 102 and the IC 103 with each other. The matching portion 110 is adjusted so that the imaginary part of an admittance possessed by the tag antenna 102 has an absolute value equivalent to the imaginary part of a susceptance of the IC 103 by changing the whole length through selecting the derived portions 111. The derived portions 111 of the matching portion 110 have a plurality of derived lines 111a, 111b, and 111c.

Dimensions of respective parts shown in FIG. 1 are as follows: the entire length of the tag antenna 102 L1=73 millimeters (mm), the space between the derived lines 111a and 111a L2=24 mm, the space between derived lines 111b and 111b L3=26 mm, the space between derived lines 111c and 111c L4=28 mm, the line width of the antenna patterns 104 and 105 W1=2 mm, the width of the gain adjusting portions 106 and 107 W2=7 mm, the line width of the derived lines 111a, 111b and 111c W3=0.5 mm, and the line width of the connecting portion 112 W4=1 mm. An internal equivalent circuit of the IC 103 has chip resistance=1.4 kilo-ohms (kΩ) and capacitance=0.7 picofarad (pF).

The derived lines 111a, 111b, and 111c are provided corresponding to a frequency used in each country in a predetermined frequency band. The derived lines 111a correspond to a frequency of 953 MHz used in Japan (JP). The derived lines 111b correspond to a frequency of 915 MHz used in the United States (US). The derived lines 111c correspond to a frequency of 868 MHz used in the European Union (EU).

In the derived lines 111a, 111b, and 111c, a marking portion 120 at which the adjustment positions for each region is marked with characters (JP, US and EU). In the example, a portion corresponding to the derived line 111a is marked with "Japan (JP)", a portion corresponding to the derived line 111b is marked with "the United States (US)", and a portion corresponding to the derived line 111c is marked with "the European Union (EU)". This marking portion 120 is marked by printing using a non-conductive material.

By selectively cutting the derived lines 111a, 111b, or 111c according to the marking portion 120, it is possible to use the tag antenna 102 commonly in various frequencies used in various countries and regions, without being limited to a single frequency.

When the tag antenna 102 is used in Japan (JP), the derived lines 111a corresponding to JP should be left. As the inductance component of the matching portion 110, the derived portions 111 forming the most inner loop with respect to the IC 103 (loop formed with one of the derived lines 111a, 111b, and 111c and the connecting portion 112) act effectively.

When using the tag antenna 102 in Japan (JP), all of the derived portions 111 (111a, 111b, and 111c) are left without being cut away as shown in FIG. 1. In this case, a loop is formed with the innermost derived lines 111a and the connecting portion 112 as the matching portion 110. The length of the loop formed out of these innermost derived lines 111a and the connecting portion 112 forms the inductance component of the matching portion 110. When the loop length of the matching portion 110 is made longer, correspondingly its inductance is proportionally increased.

Figure 2:
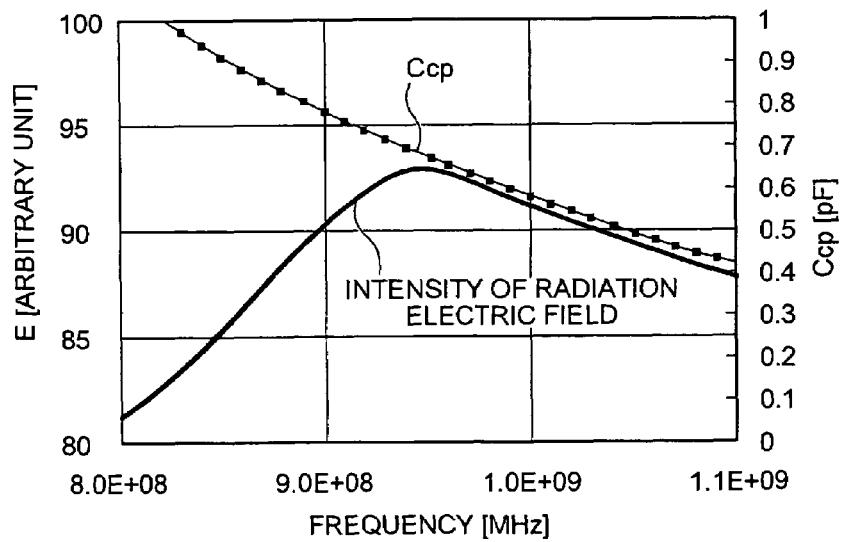
FIG. 2 is a schematic for illustrating a result of electromagnetic field simulation of the RFID tag shown in FIG. 1.

FIG. 2 is a schematic for illustrating a result of electromagnetic field simulation of the RFID tag 100. The axis of abscissas represents frequencies, and the axes of ordinates represent the intensity of radiation electric field E of the tag antenna 102 and the capacitance Ccp of the IC 103 in case of being used in Japan (JP). An internal equivalent circuit of the IC 103 has 1.4 kΩ and 0.7 pF.

As shown in FIG. 2, there has been obtained a simulation result that the intensity of radiation electric field E has a peak and the capacitance Ccp of the IC 103 becomes 0.7 pF at a frequency of 953 MHz used in Japan (JP). This simulation result shows a result of providing the optimum matching with the IC 103 due to the inductance component of a specific length (L2) formed out of the derived lines 111a selected as the matching portion 110 and the connecting portion 112.

Figure 3:
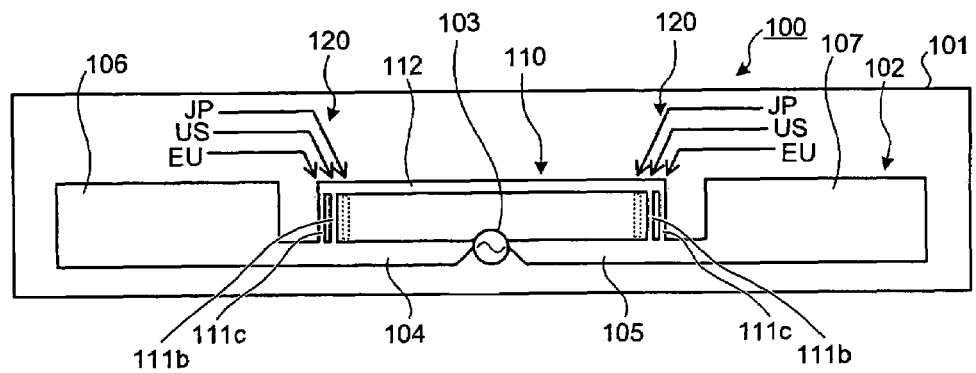
FIG. 3 is a schematic for illustrating adjustment of a tag antenna.

Next, FIG. 3 is a schematic for illustrating adjustment of a tag antenna. In case of using the tag antenna 102 in the United States (US), as shown in FIG. 3, the derived lines 111b located at the positions US are left to be used according to marks US of the marking portions 120. In this case the derived lines 111a of Japan (JP) are cut away using a cutter or the like (spots shown by dotted lines in the figure). Thereby, a loop is formed with the most inner derived lines 111b and the connecting portion 112 as the matching portion 110.

Figure 4:
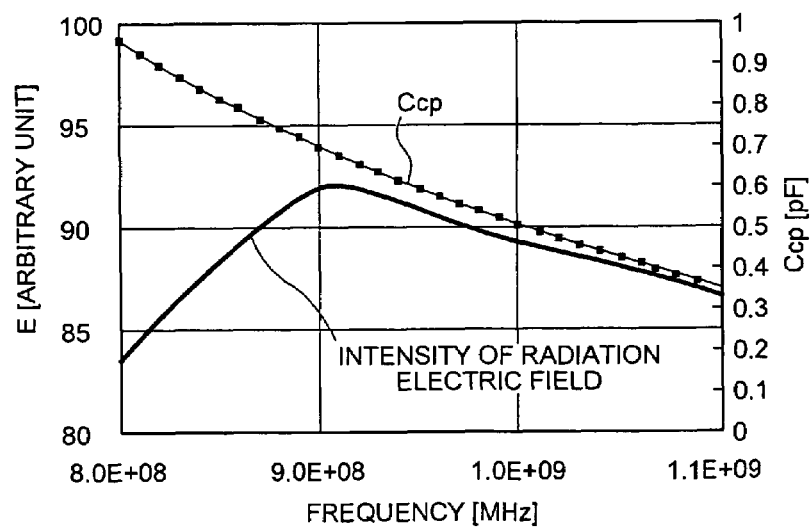
FIG. 4 is a schematic for illustrating a result of electromagnetic field simulation of the RFID tag shown in FIG. 3.

FIG. 4 is a schematic for illustrating a result of electromagnetic field simulation of the RFID tag shown in FIG. 3. The axis of abscissas represents frequencies, and the axes of ordinates represent the intensity of radiation electric field E of the tag antenna 102 and the capacitance Ccp of the IC 103 in case of being used in the United States (US). As shown in FIG. 4, there has been obtained a simulation result that the intensity of radiation electric field E has a peak and the capacitance Ccp of the IC 103 becomes 0.7 pF at a frequency of 915 MHz used in the United States (US). This simulation result shows a result of providing the optimum matching with the IC 103 due to the inductance component of a specific length (L3) formed out of the derived lines 111b selected as the matching portion 110 and the connecting portion 112.

Figure 5:
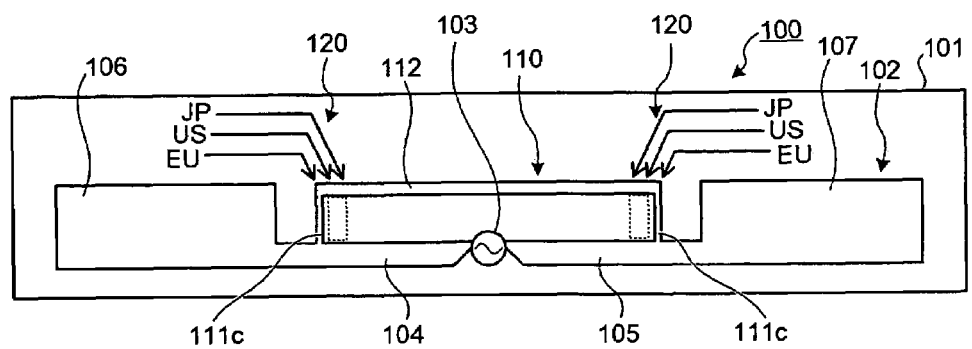
FIG. 5 is a schematic for illustrating another adjustment of the tag antenna.

Next, FIG. 5 is a schematic for illustrating adjustment of the tag antenna. In case of using the tag antenna 102 in the European Union (EU), as shown in FIG. 5, the derived lines 111c located at the positions EU are left to be used according to marks EU of the marking portions 120. In this case the derived portions 111a of Japan (JP) and the derived lines 111b of the United States (US) are cut away using a cutter or the like (spots shown by dotted lines in the figure). Thereby, a loop is formed out of the derived lines 111c and the connecting portion 112 as the matching portion 110.

Figure 6:
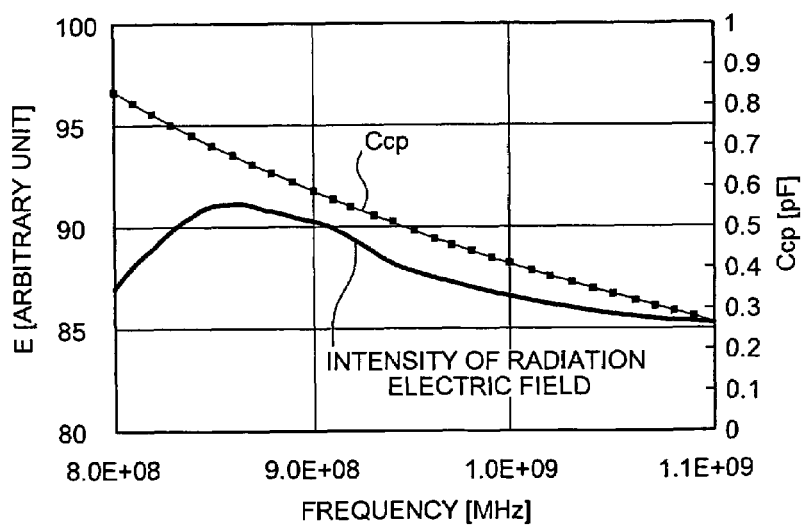
FIG. 6 is a schematic for illustrating a result of electromagnetic field simulation of the RFID tag shown in FIG. 5.

FIG. 6 is a schematic for illustrating a result of electromagnetic field simulation of the RFID tag shown in FIG. 5. The axis of abscissas represents frequencies, and the axes of ordinates represent the intensity of radiation electric field E of the tag antenna 102 and the capacitance Ccp of the IC 103 in case of being used in the European Union (EU). As shown in FIG. 6, there has been obtained a simulation result that the intensity of radiation electric field E has a peak and the capacity Ccp of the IC 103 becomes 0.7 pF at a frequency of 868 MHz used in the European Union (EU). This simulation result shows a result of providing the optimum matching with the IC 103 due to the inductance component of a specific length (L4) formed out of the derived lines 111c selected as the matching portion 110 and the connecting portion 112.

In the first embodiment, the length (one of L1, L2 and L3) of an inductance component in the matching portion 110 is changed corresponding to each of the frequencies used in the three countries (Japan, the United States and the European Union). By making the number of the derived portions 111 provided in the matching portion 110 in advance correspond to the number of used frequencies, it is possible to make a single RFID tag compatible with various frequencies.

According to the first embodiment, a single RFID tag can be used in countries and areas using different frequencies. In this case, the tag antenna 102 and the IC 103 can be matched with each other by only adjusting the matching portion 110. Thus, it is possible to provide an RFID tag having high radiation efficiency capable of sufficiently feeding a power received through a tag antenna to an IC even when used frequency varies.

Figure 7:
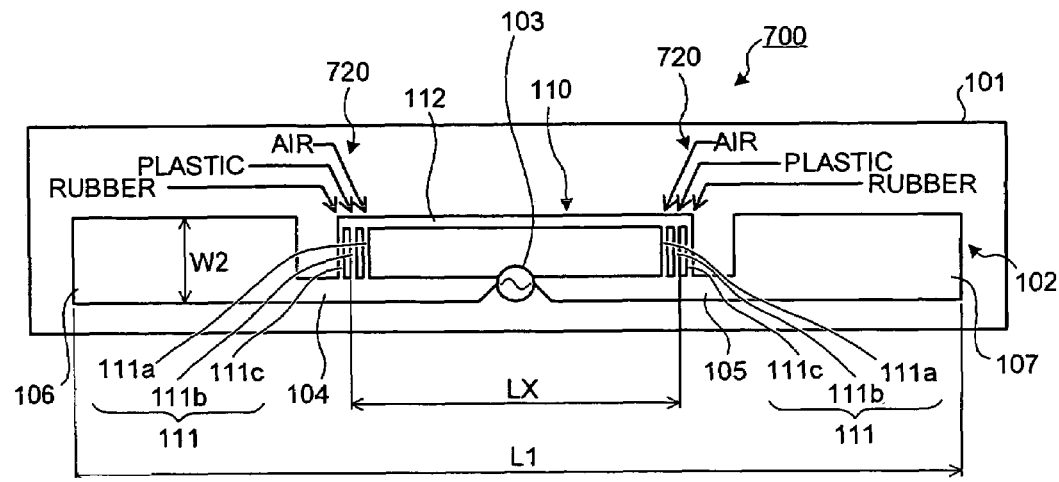
FIG. 7 is a schematic of an RFID tag according to a second embodiment of the present invention.

FIG. 7 is a schematic of an RFID tag according to a second embodiment of the present invention. An RFID tag 700 has a similar configuration as the first embodiment (see FIG. 1). The RFID tag 700 has a different content of a marking portion 720 from that of the first embodiment. The marking portion 720 marks a material to which the RFID tag 700 is attached. It is assumed that a frequency (country or area) at which this RFID tag 700 is used is fixed.

In this RFID tag 700, the wavelength of a resonant wave varies depending on the dielectric constant (∈r) of the material. Therefore, the length of a loop of the matching portion 110 is changed so as to be an inductance length corresponding to each material.

Figure 8:
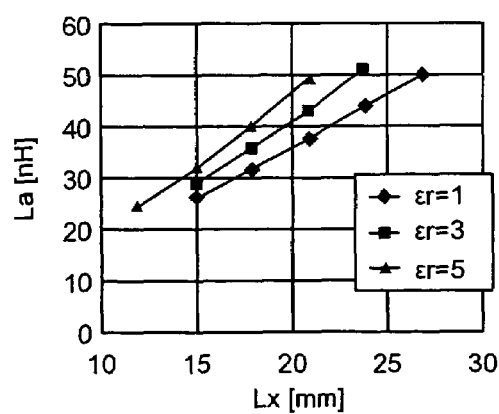
FIG. 8 is a schematic for illustrating a result of simulation indicating a relation between an inductance length and an inductance of a tag antenna.

FIG. 8 is a schematic for illustrating a simulation result showing the relation between the inductance length and the inductance of a tag antenna. The axis of abscissas represents inductance length LX (the length of a loop of the matching portion 110) and the axis of ordinates represents inductance La. The tag antenna 102 of the RFID tag 700 is assumed to be a dipole antenna in which the entire length (L1)=60 mm and width (W2)=10 mm (effective entire length about 75 mm=λ/4). And it is assumed that a material having this RFID tag 700 stuck on it has a thickness of t=1 mm and a dielectric constant of 1, 3 or 5. The dielectric constant (∈r) is ∈r=1 in air, ∈r=3 to 4 in plastic and ∈r=4 to 5 in rubber.

As shown in FIG. 8, a simulation result shows that inductance length LX is substantially linearly proportional to inductance La in any dielectric constant although each dielectric constant (each material to be stuck) shows a different straight line.

According to the above simulation result, in order that the inductance La of a tag antenna becomes 40 nanohenry (nH) matching with the IC 103 of Ccp=0.7 pF, it is enough to select LX=22 mm from the curve of ∈r=1 (air) in case of using the tag antenna 102 alone, that is, when the RFID tag 700 is not attached to any material. It is enough to select LX=20 mm in case of sticking it on a material of ∈r=3 (plastic) and 1 mm in thickness, and it is enough to select LX=18 mm in case of sticking it on a material of ∈r=5 (rubber) and 1 mm in thickness.

The matching portion 110 is provided with a plurality of the derived portions 111 (111a, 111b, and 111c) so as to have a different inductance length LX for each material corresponding to the above description. And the derived portions 111 are provided with the marking portions 720 marked with the names of the material. As shown in FIG. 8, the respective marks of the marking portions 720 mark the inside derived lines 111a forming the shortest loop as an inductance length of the matching portion 110 as "AIR", mark the most outside derived lines 111c as "RUBBER" and mark the intermediate derived lines 111b as "PLASTIC".

By selectively cutting away the derived lines 111a, 111b, or 111c corresponding to the material, it is possible to commonly use the RFID tag 700 with various materials, without being limited to a single material.

When the RFID tag 700 is used in the air, all of the derived portions 111 (111*a*, 111*b*, and 111*c*) is left to be used without being cut away (the derived lines 111*a* at positions of AIR are left).

When the RFID tag 700 is attached to a plastic member, the derived lines 111*b* at positions of PLASTIC are left to be used according to marks of PLASTIC of the marking portions 720. In this case, the derived lines 111*a* of AIR are cut away using a cutter or the like.

When the RFID tag 700 is attached to a rubber member, the derived lines 111*c* at positions of RUBBER are left to be used according to marks of RUBBER of the marking portions 720. In this case, the derived lines 111*a* of AIR and the derived lines 111*b* of PLASTIC are cut away using a cutter or the like.

In the second embodiment, the inductance length LX in the matching portion 110 is changed corresponding to each of the dielectric constants of the three different materials (air, plastic, and rubber). By making the number of the derived portions 111 provided in the matching portion 110, in advance, correspond to the number of attached materials having different dielectric constant, it becomes possible to use a single RFID tag with various materials to which the RFID tag is attached.

According to the second embodiment, a single RFID tag can be used being attached to various materials having different dielectric constant. A tag antenna and an IC in the RFID tag can be matched with each other by only adjusting a matching portion. Thereby, it is possible to provide an RFID tag having high radiation efficiency capable of sufficiently feeding a power received through the tag antenna to the IC even when the RFID tag is attached to various materials.

While in the first and the second embodiments, the marks of the marking portions 120 and 720 are marked using character strings in near the derived portions 111, the marks are not thus limited, and symbols may be used for marking the marking portions 120 and 720.

Figure 9:
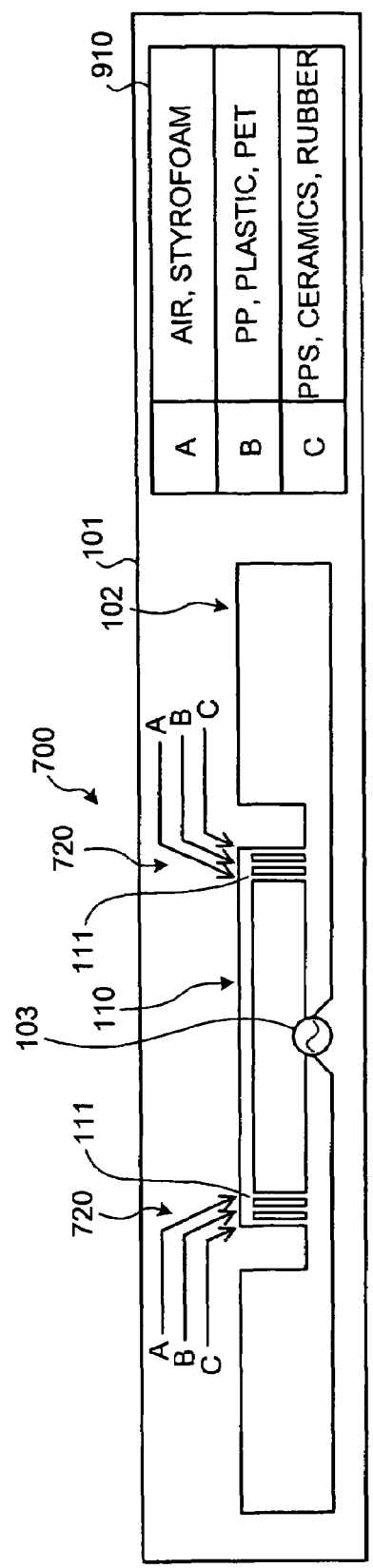
FIG. 9 is a schematic for illustrating marking of a marking portion.

FIG. 9 is a schematic for illustrating another marking of the marking portions. If it is difficult to mark character strings near the derived portions 111 due to limitations of space, the marking portions 720 may be marked with a small number of symbols or numerals. In the example shown in FIG. 9, each position in the marking portions 720 is marked with one alphabetic character (A, B, and C). Detailed contents 910 corresponding to alphabetic characters (A, B, and C) of the marking portions 720 are indicated in a free space (margin) on the film base 101. The detailed contents 910 are not written on the film base 101 but written in a place different from the film base 101, for example, in a booklet and the like such as an instruction manual of the RFID tag 700. Thus, it is possible to make the RFID tag 700 in a compact size without occupying a space for the marking portions 720 on the film base 101.

Figure 10:
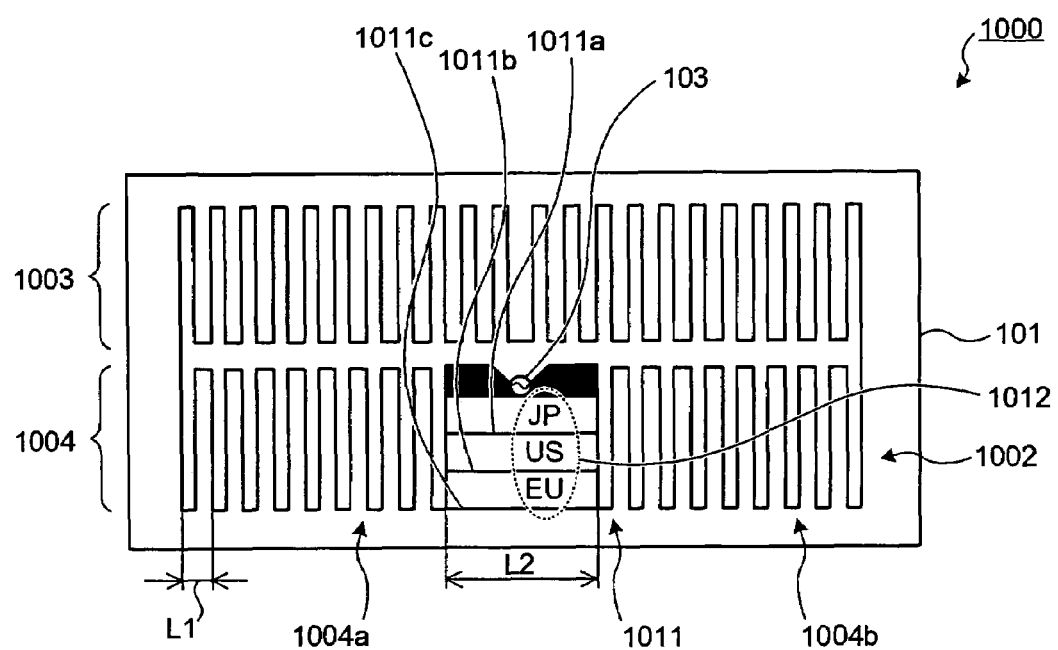
FIG. 10 is a schematic of an RFID tag having a meander-line antenna according to a third embodiment.

In a third embodiment, plural examples of a tag antenna with different shapes are described. FIG. 10 is a schematic of an RFID tag (meander-line antenna) according to the third embodiment. The same reference characters refer to the same components as in the first embodiment. An RFID tag 1000 shown in FIG. 10 is different from that of the first embodiment (see FIG. 1) in that a conductor pattern forming a tag antenna 1002 is folded down in a meander shape.

The tag antenna 1002 is folded in various methods to form into a meander shape. In an example shown in FIG. 10 an upper half part 1003 and a lower half part 1004 are folded in a similar shape. The pitch between folded portions of the antenna pattern is L1. The IC 103 is provided at a power feed point substantially in the middle of the lower half part 1004.

There is a specific space L2 between antenna patterns 1004*a* and 1004*b* being opposite to each other around the spot where the IC 103 is disposed, and a matching portion 1011 is provided between the antenna patterns 1004*a* and 1004*b*.

Similarly to the first embodiment, the matching portion 1011 is provided in parallel with the antenna patterns 1004*a* and 1004*b* with respect to the IC 103 in order to match the tag antenna 1002 and the IC 103 with each other. This matching portion 1011 has a plurality of derived lines 1011*a*, 1011*b*, and 1011*c*, and can change an inductance component in a part leading to the IC 103. Thus, it is possible to perform adjustment so that the imaginary part of admittance possessed by the tag antenna 1002 has an absolute value equivalent to the imaginary part of susceptance of the IC 103.

The derived lines 1011*a*, 1011*b*, and 1011*c* of the matching portion 1011 are provided corresponding to each frequency used in each country in predetermined frequency bands. The derived line 1011*a* corresponds to a frequency used in Japan (JP) of 953 MHz, for example. The derived line 1011*b* corresponds to a frequency of 915 MHz used in the United States (US). The derived line 1011*c* corresponds to a frequency of 868 MHz used in the European Union (EU).

The derived lines 1011*a*, 1011*b*, and 1011*c* are respectively provided with a marking portion 1012 marking adjustment positions necessary by countries with characters (JP, US, and EU). In the illustrated example, the derived line 1011*a* is marked with "Japan (JP)", the derived line 1011*b* is marked with "the United States (US)", and the derived line 1011*c* is marked with "the European Union (EU)".

By selectively cutting the derived lines 1011*a*, 1011*b* or 111*c* for each of the areas according to the content of marking of the marking portion 1012, the tag antenna 1002 can be commonly used at various frequencies used in the respective countries and areas, without being limited to a single frequency.

When the tag antenna 1002 is used in Japan (JP), the derived line 1041*a* at the position JP is left according to mark JP of the marking position 1012. As the inductance component of the matching portion 1011, one of the derived lines 1011*a*, 1011*b*, and 1011*c* forming the most inner loop from the IC 103 acts effectively.

In other words, when the tag antenna 1002 is used in Japan (JP), all of the derived portions 1011*a*, 1011*b*, and 1011*c* are left, without being cut away, as shown in FIG. 10. In this case, a loop is formed by the innermost derived line 1011*a* as the matching portion 1011. The length of the loop formed out of the innermost derived line 1011*a* forms the inductance component of the matching portion 1011.

when the tag antenna 1002 is used in the United States (US), the derived line 1011*b* at position US is left to be used according to mark US of the marking portion 1012. In this case, the derived line 1011*a* of Japan (JP) is cut away using a cutter or the like. Thus, a loop is formed by the innermost derived line 1011*b* as the matching portion 1011.

When the tag antenna 1002 is used in the European Union (EU), the derived line 1011*c* at position EU is left to be used according to mark EU of the marking portion 1012. In this case, the derived line 1011*a* of Japan (JP) and the derived line 1011*b* of the United States (US) are cut away using a cutter or the like. Thus, a loop is formed by the derived line 1011*c* as the matching portion 1011.

Since an inductance component is changed by selecting the derived portion 1011*a*, 1011*b*, or 1011*c*, it is possible to match with the IC 103 even when a used frequency varies. The marks of the marking portion 1012 may indicate names of materials to which the RFID tag is attached as described in the second embodiment. In this case it is possible to match the tag antenna 1002 and the IC 103 with each other even when the RFID tag is attached to different materials. Particularly, by using a meander-line antenna as the tag antenna 1002, the antenna can be made smaller compare to a case in which a dipole antenna is used. A conductor pattern as a meander-line antenna is not limited to a bent and folded shape shown in FIG. 10 but may be in various shapes.

Figure 11:
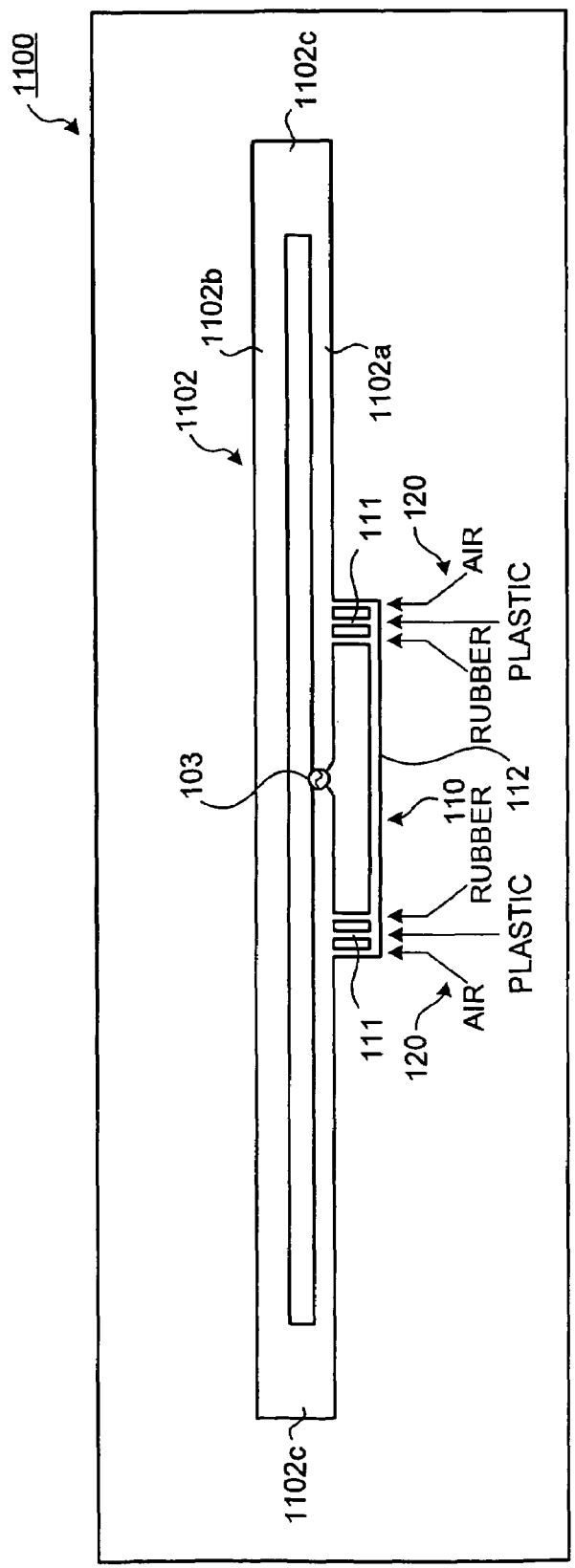
FIG. 11 is a schematic of an RFID tag having a folded-back dipole antenna according to the third embodiment.

FIG. 11 is a schematic of an RFID tag (folded-back dipole antenna) according to the third embodiment. A tag antenna 1102 of an RFID tag 1100 shown in FIG. 11 is different from the first embodiment (see FIG. 1) in that two dipole antennas 1102a and 1102b are provided in parallel, and both ends of the dipole antennas 1102a and 1102b are respectively connected with each other by connecting portions 1102c. The dipole antenna 1102a of one side is provided with a power feed point in substantially the middle thereof and the IC 103 is disposed. The tag antenna 1102 has an advantage of having larger radiation resistance than the tag antenna 102 of the first embodiment (see FIG. 1).

The dipole antenna 1102a is provided with the matching portion 110 (the derived portions 111 and the connecting portion 112) and the marking portions 120. The matching portion 110 and the marking portions 120 are formed in a similar manner as the first embodiment. While the marking portions 120 in the example mark materials to which the RFID tag is attached, the marking portions may mark frequencies to be used. By selecting the derived portions 111 according to marks of the marking portions 120, it is possible to change the inductance component and to match the tag antenna 1102 and the IC 103 with each other.

Figure 12:
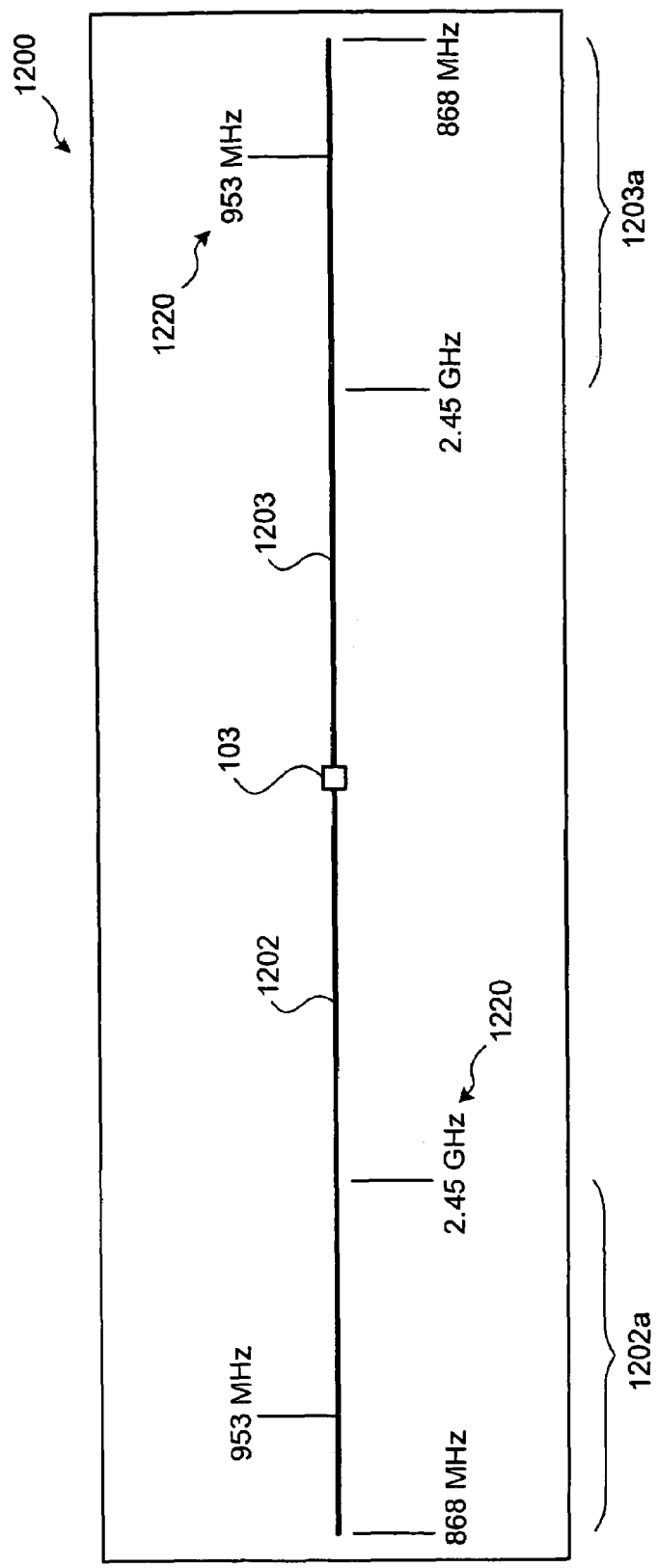
FIG. 12 is a schematic of an RFID tag having a dipole antenna according to the third embodiment.

FIG. 12 is a schematic of an RFID tag (dipole antenna) according to the third embodiment. An RFID tag 1200 shown in FIG. 12 is a dipole antenna including a pair of tag antennas 1202 and 1203 having the IC 103 as its power feed point. A length of the tag antennas 1202 and 1203 are changed according to a frequency used in each country. to make this change, marking portions 1220 are provided. The marking portions 1220 are marked with frequencies (for example, 868 MHz, 953 MHz, and 2.45 GHz) to be used in different countries.

When using the RFID tag 1200, the tag antennas 1202 and 1203 are adjusted to be compatible with a frequency at which the RFID tag 1200 is used by cutting a part of the tag antennas 1202 and 1203 based on a marking portion 1220 indicating frequencies. Symbols 1202a and 1203a respectively show the cutting ranges in the tag antennas 1202 and 1203 to adjust the tag antennas 1202 and 1203 suitable for a used frequency. For example, when the used frequency is 868 MHz, all of the tag antennas 1202 and 1203 are left without being cut away. And when the used frequency is 2.45 GHz, the tag antennas 1202 and 1203 are cut in a range from the ends to the positions marked with 2.45 GHz of the marking portions 1220 by a cutter or the like.

According to the above configuration, it is possible to adjust the length of the tag antennas 1202 and 1203 according to the marking portions 1220 so that the single RFID tag 1200 at various frequencies used in different countries. The marked contents of the marking portions 1220 are not limited to frequencies, and may be the names of a tag reader/writer communicating with the RFID tag 1200. Thus, even if a used frequency varies depending on tag reader/writers, the RFID tag 1200 can be made compatible with the tag reader/writer.

Figure 13:
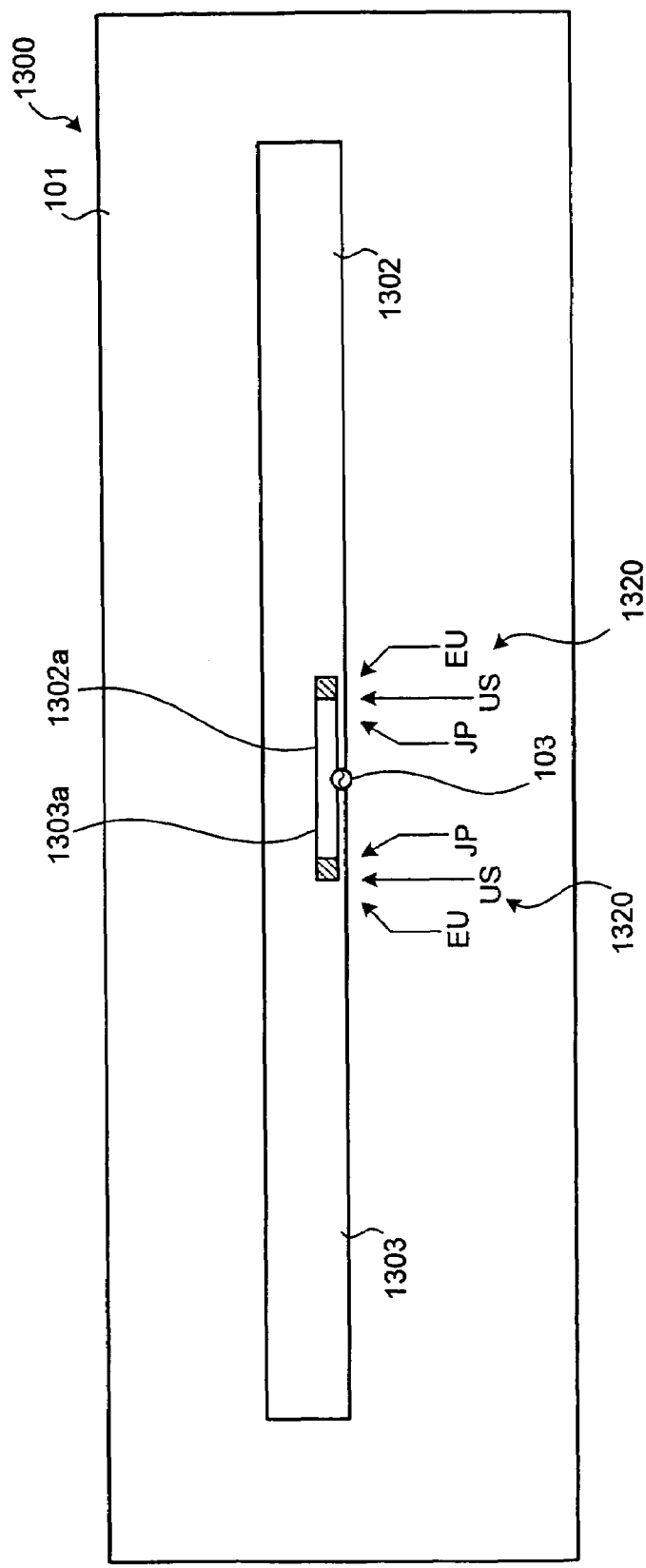
FIG. 13 is a schematic of an RFID tag having a dipole antenna according to the third embodiment.

FIG. 13 is a schematic of an RFID tag (dipole antenna) according to the third embodiment. An RFID tag 1300 includes tag antennas 1302 and 1303 extending from both sides of the IC 103 with slots 1302a and 1303a, respectively. In other words, two conductor patterns are formed above and below the slots 1302a and 1303a sandwiching the slots 1302a and 1303a.

On the film base 101, marking portions 1320 marking the adjustment positions necessary by countries are marked with characters (JP, US, and EU) beside the slots 1302a and 1303a.

In an example shown in FIG. 13, a case in which the RFID tag 1300 is used in the United States (US) is shown. The illustrated example shows a state in which a positional range from Japan (JP) to US (range hatched in the figure) are cut away in the slots 1302a and 1303a according to marks of US of the marking portions 1320 by a cutter or the like. When the RFID tag 1300 is used in Japan (JP), the slots 1302a and 1303a are not cut away, and when the RFID tag 1300 is used in the European Union (EU), a positional range from Japan (JP) to EU is cut away in the slots 1302a and 1303a. The slots 1302a and 1303a may be perforated in advance so that ranges from JP to US and US to EU are easily tore away, thereby easily changing the slot length without using a cutter or the like.

According to the above configuration, by setting slot lengths by cutting a portion away in the slots 1302a and 1303a depending on a country in which the RFID tag is used, it is possible to commonly use the RFID tag 1300 at various frequencies used in different countries and areas without being limited to a single frequency.

According to the respective configurations of the third embodiment, it is possible to use a single RFID tag in countries and areas using different frequencies or with materials to which the RFID tag is attached. In this case, it is possible to match a tag antenna with an IC by only adjusting a matching portion. Thereby, it is possible to provide an RFID tag having high radiation efficiency capable of sufficiently feeding a power received through a tag antenna to an IC even if used frequency or an attached material varies.

Figure 14:
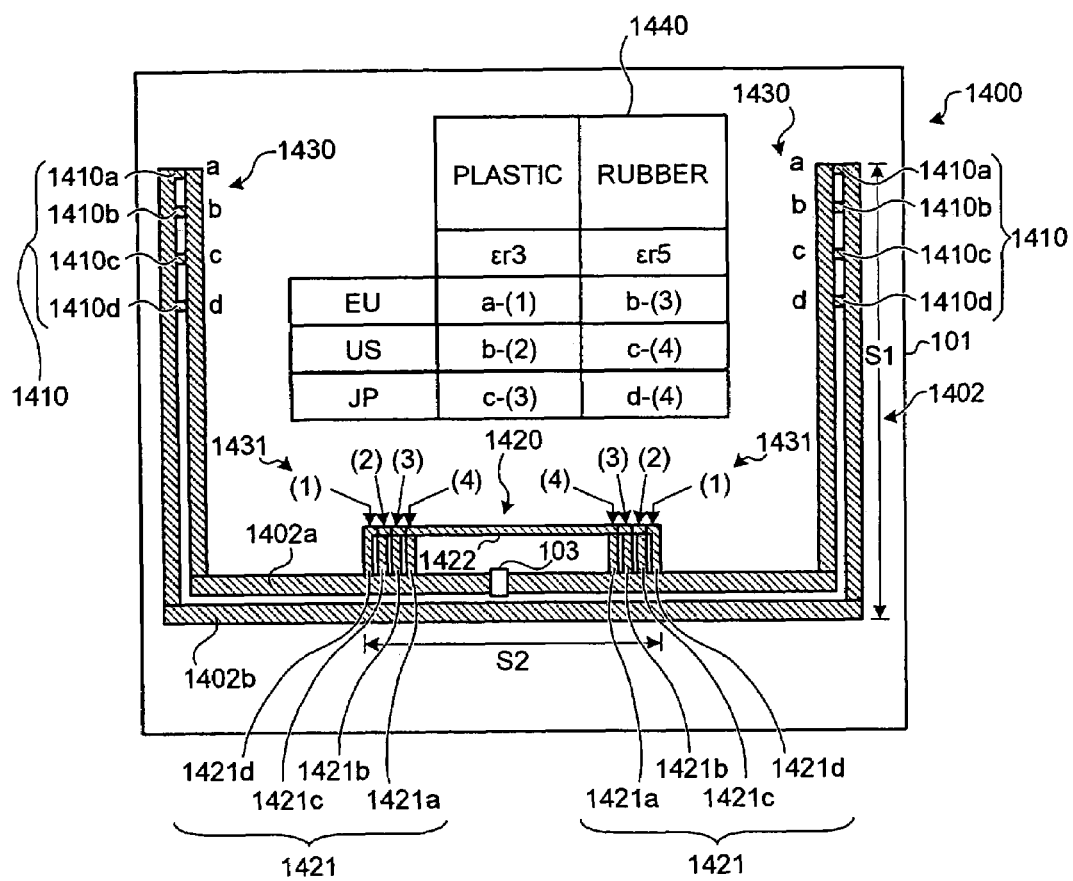
FIG. 14 is a schematic of an RFID tag according to a fourth embodiment of the present invention.

FIG. 14 is a schematic of an RFID tag according to a fourth embodiment of the present invention. An RFID tag 1400 of the fourth embodiment has a configuration in which matching of an antenna with an IC is performed in combination of used frequencies and attached materials.

In the RFID tag 1400, the film base 101 has a predetermined width and length, and a tag antenna 1402 is a folded-back dipole antenna formed with a pair of conductor patterns 1402a and 1402b arranged in parallel with each other (see the tag antenna 1102 of FIG. 11). In an example shown in FIG. 14, the tag antenna 1402 is substantially in a U shape in which it is bent along the outer edges of the film base 101.

A power feed point at which the IC 103 is disposed is arranged on a conductor pattern 1402a at the inner side of the bent tag antenna 1402. First matching portions 1410 are respectively provided at both end portions of the tag antenna 1402. A second matching portion 1420 is connected to the conductor pattern 1402a at the inner side of the bent tag antenna 1402.

The first matching portions 1410 are structured with plural connecting lines 1410a, 1410b, 1410c, and 1410d provided between the conductor patterns 1402a and 1402b. The length of a folded-back portion of the tag antenna 1402 (conductor patterns 1402a and 1402b) can be changed by selecting the connecting lines 1410a, 1410b, 1410c, and 1410d. The matching of the tag antenna 1402 with the IC 103 can be optimized by adjusting the length S1 of the first matching portion 1410. A marking portion 1430 is provided for each of the connecting lines 1410a, 1410b, 1410c, and 1410d at a side of the first matching portion 1410. An illustrated example of the marking portions 1430 is marked with alphabetic characters a, b, c, and d.

The second matching portion 1420 is connected to the conductor pattern 1402a with the IC 103 as the center. This second matching portion 1420 includes derived portions 1421 and a connecting portion 1422. The inductance length of the whole second matching portion 1420 relative to the IC 103 is changed by selecting the derived lines 1421a, 1421b, 1421c, and 1421d. The antenna gain of the tag antenna 1402 can be optimized by adjusting the length S2 of the second matching portion 1420. A marking portion 1431 is provided for each of the connecting lines 1421a, 1421b, 1421c, and 1421d beside the derived portion 1421. An illustrated example of the marking portions 1431 is marked with parenthesized numerals (1), (2), (3), and (4).

By combining the selection of the first matching portion 1410 and the selection in the second matching portion 1420, the RFID tag 1400 can be adjusted to changes of a used frequency and an attached material.

Detailed contents 1440 to specify the combination of the selections in the marking portions 1430 and 1431 are marked on the film base 101. The detailed contents 1440 are shown in the form of a table in which the names of countries corresponding to used frequencies are marked along the axis of ordinates and the types of attached materials (dielectric constants) are marked along the axis of abscissas. According to the marks of the detailed contents, it is possible to determine the combination of the selection in the first matching portions 1410 (connecting lines 1410a, 1410b, 1410c, and 1410d) with the selection in the second matching portion 1420 (derived lines 1421a, 1421b, 1421c, and 1421d) corresponding to a used frequency (country) and an attached material for the RFID tag 1400.

For example, when the RFID tag 1400 is used in the European Union (EU) and an attached material is plastic, the connecting line 1410a is selected in the first matching portion 1410 and the derived line 1421d is selected in the second matching portion 1420 based on a mark "a-(1)" indicated in the table of the detailed contents 1440.

An example of dimensions of each component shown in FIG. 14 is described. The width of the tag antenna 1402 (conductor patterns 1402a and 1402b)=2 mm, and the space between the conductor patterns 1402a and 1402b=1 mm. The width of each of the connecting lines 1410a, 1410b, 1410c, and 1410d=1 mm. And as for the length S1 of the first matching portion 1410, taking a bent portion of the conductor pattern 1402b as a reference point, the length to the connecting line 1410a=48 mm, the length to the connecting line 1410b=44 mm, the length to the connecting line 1410c=39 mm, and the length to the connecting line 1410d=34 mm.

The width of each of the derived lines 1421a, 1421b, 1421c, and 1421d of the second matching portion 1420 and the connecting portion 1422=1 mm. And as for the length S2 of the second matching portion 1420, the length between a pair of derived lines 1421a=24 mm, the length between the derived lines 1421b=27 mm, the length between the derived lines 1421c=30 mm, and the length between the derived lines 1421d=33 mm. The parallel capacitance Ccp of the LSI=0.6 pF.

Figure 15:
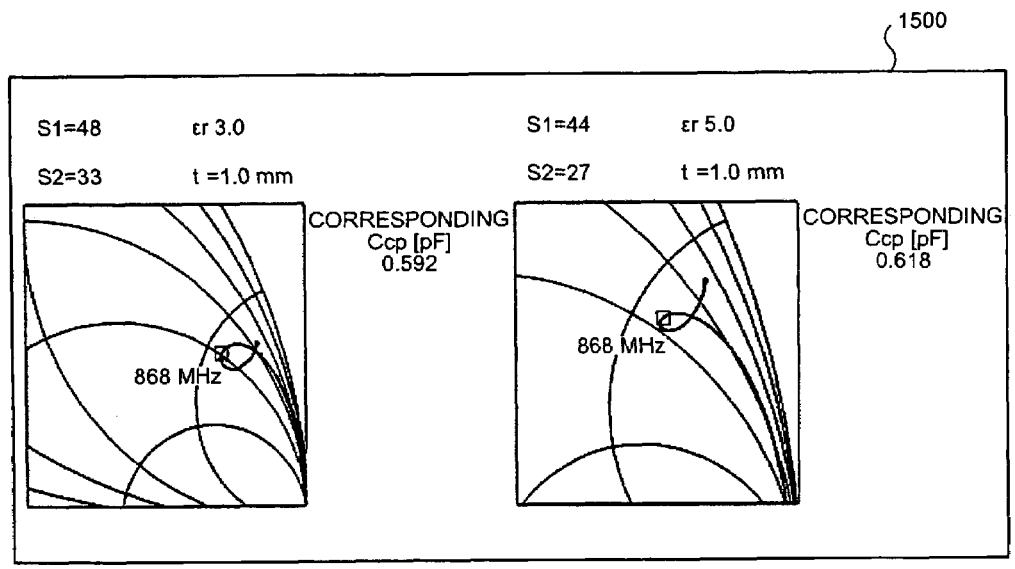
FIG. 15 is a schematic for illustrating an impedance characteristic when a used frequency is 868 MHz.
Figure 16:
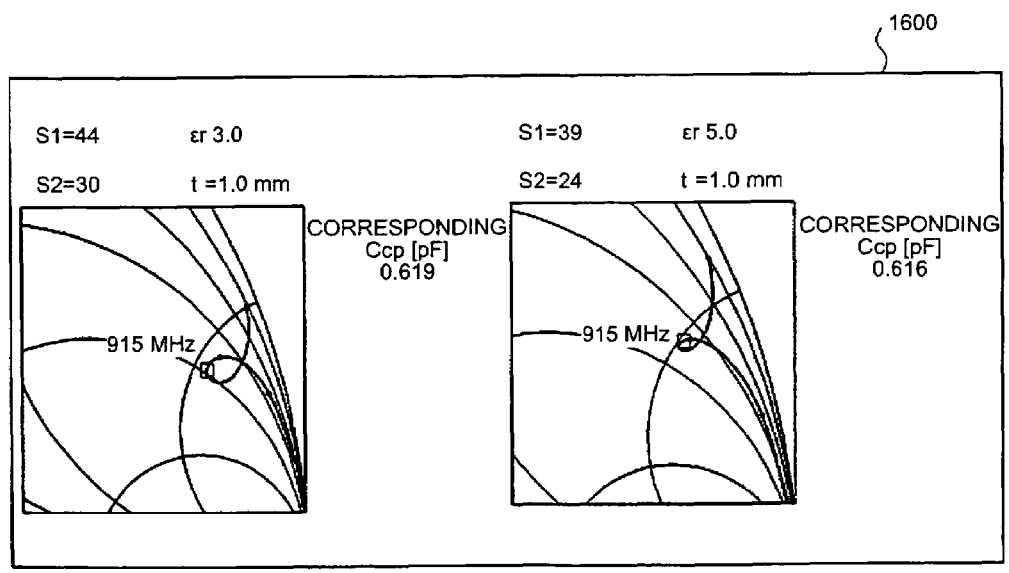
FIG. 16 is a schematic for illustrating an impedance characteristic when a used frequency is 915 MHz.
Figure 17:
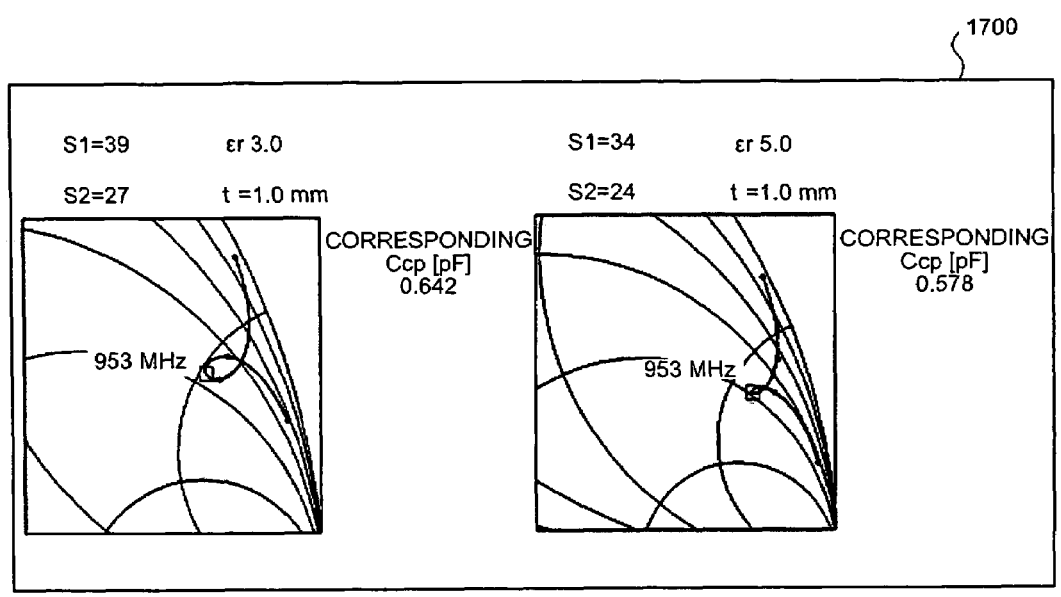
FIG. 17 is a schematic for illustrating an impedance characteristic when a used frequency is 953 MHz (Japan).

FIGS. 15 to 17 are Smith charts (a part of charts) showing impedance characteristics corresponding to used frequencies and attached materials for the RFID tags.

First, FIG. 15 is a schematic for illustrating an impedance characteristic 1500 when "used frequency=868 MHz (the European Union)". This impedance characteristic shows that the gain is the highest at the peak of a characteristic curve. By adjusting the length S1 of the first matching portion 1410, it is possible to bring the impedance to the peak of the Smith chart. And by adjusting the length S2 of the second matching portion 1420, the susceptance B can cancel the parallel capacitance Ccp of the IC 103. A relation of "Ccp=−B/(2πf)" exists.

The left side of FIG. 15 is an example in which the attached material is plastic (dielectric constant=3.0 and thickness=1.0 mm). This characteristic is obtained by selecting "a-(1)" as marked on the detailed contents 1440 shown in FIG. 14. That is, "S1=48 mm (select the connecting line 1410a) and "S2=33 mm (select the derived lines 1421d). The corresponding capacitance in this case is "Ccp=0.592 pF".

Specifically, in the first matching portion 1410, other connecting lines 1410b to 1410d are cut away by a cutter or the like so that the length S1 of the first matching portion 1410 is determined by the connecting line 1410a. In the second matching portion 1420, other inside derived lines 1421a to 1421c are cut away by a cutter or the like so that the length S2 of the second matching portion 1420 is determined by the derived lines 1421d.

The right side of FIG. 15 is an example in which the attached material is rubber, melamine resin, or the like (dielectric constant=5.0 and thickness=1.0 mm). This characteristic is obtained by selecting "b-(3)" as marked on the detailed contents 1440 shown in FIG. 14. That is, "S1=44 mm (select the connecting line 1410b) and "S2=27 mm (select the derived lines 1421b). The corresponding capacitance in this case is "Ccp=0.618 pF".

Specifically, in the first matching portion 1410, other connecting lines 1410c and 1410d are cut away by a cutter or the like so that the length S1 of the first matching portion 1410 is determined by the connecting line 1410b. In the second matching portion 1420, other inside derived lines 1421a are cut away by a cutter or the like so that the length S2 of the second matching portion 1420 is determined by the derived lines 1421b.

FIG. 16 is a schematic for illustrating an impedance characteristic 1600 when "used frequency=915 MHz (the United States)". The left side of the figure is an example in which the attached material is plastic (dielectric constant=3.0 and thickness=1.0 mm). This characteristic is obtained by selecting "b-(2)" as marked on the detailed contents 1440 in FIG. 14. That is, "S1=44 mm (select the connecting line 1410b) and "S2=30 mm (select the derived lines 1421c). The corresponding capacitance in this case is "Ccp=0.619 pF".

Specifically, in the first matching portion 1410, other connecting lines 1410c and 1410d are cut away by a cutter or the like so that the length S1 of the first matching portion 1410 is determined by the connecting line 1410b. In the second matching portion 1420, other inside derived lines 1421a and 1421b are cut away by a cutter or the like so that the length S2 of the second matching portion 1420 is determined by the derived lines 1421c.

The right side of FIG. 16 is an example in which the attached material is rubber, melamine resin, or the like (dielectric constant=5.0 and thickness=1.0 mm). This characteristic is obtained by selecting "c-(4)" as marked on the detailed contents 1440 shown in FIG. 14. That is, "S1=39 mm (select the connecting line 1410c) and "S2=24 mm (select the derived lines 1421a). The corresponding capacitance in this case is "Ccp=0.616 pF".

Specifically, in the first matching portion 1410, other connecting lines 1410d are cut away by a cutter or the like so that the length S1 of the first matching portion 1410 is determined by the connecting line 1410c. In the second matching portion 1420, these derived lines 1421a (other derived lines 1421b to 1421d may be also left) are left so that the length S2 of the second matching portion 1420 is determined by the derived lines 1421a.

FIG. 17 is a schematic for illustrating an impedance characteristic 1700 when "used frequency=953 MHz (Japan)". The left side of the figure is an example in which the attached material is plastic (dielectric constant=3.0 and thickness=1.0 mm). This characteristic is obtained by selecting "c-(3)" as marked on the detailed contents 1440 shown in FIG. 14. That is, "S1=39 mm (select the connecting line 1410c) and "S2=27 mm (select the derived lines 1421b). The corresponding capacity in this case is "Ccp=0.642 pF".

Specifically, in the first matching portion 1410, other connecting lines 1410d are cut away by a cutter or the like so that the length S1 of the first matching portion 1410 is the connecting line 1410c. In the second matching portion 1420, other inside derived lines 1421a are cut away by a cutter or the like so that the length S2 of the second matching portion 1420 is determined by the derived lines 1421b.

The right side of FIG. 17 is an example in which the attached material is rubber, melamine resin, or the like (dielectric constant=5.0 and thickness=1.0 mm). This characteristic is obtained by selecting "d-(4)" as marked on the detailed contents 1440 shown in FIG. 14. That is, "S1=34 mm (select the connecting line 1410d) and "S2=24 mm (select the derived lines 1421a). The corresponding capacitance in this case is "Ccp=0.578 pF".

Specifically, in the first matching portion 1410, the length S1 of the first matching portion 1410 is determined by the connecting line 1410d. In this case, other connecting lines 1410a to 1410c are left without being cut away. In the second matching portion 1420, these derived lines 1421a (other derived lines 1421b to 1421d may be also left) are left so that the length S2 of the second matching portion 1420 is determined by the derived lines 1421a.

According to the fourth embodiment, it is possible to make the RFID tag 1400 compatible with various frequencies used in different countries and with various materials to which the RFID tag 1400 is attached. It is possible to match an antenna with an IC so as to be appropriate for combinations of such different used frequencies and different attached materials.

While in the above description, a case of a non-contact type RFID tag has been described as an example, the present invention is not thus limited and may be similarly applied to a non-contact type IC card, tags and cards having various shapes and applications.

According to the embodiments described above, it is possible to properly perform an antenna matching operation without causing an error. Thus, it is possible to use a single RFID tag at various frequencies with various materials to which the RFID tag is attached.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radio frequency identification tag comprising:
an antenna including a conductor pattern in a form of dipole, and connected to an integrated circuit chip of the radio frequency identification tag;
an adjusting portion including at least one adjusting pattern connected to the conductor pattern to make the antenna compatible with an environment in which the antenna is used by adjusting only one parameter of impedance, wherein the one parameter of impedance that is adjusted is an imaginary portion of the impedance; and
a marking portion at which instructions for an adjusting operation using the adjusting portion are indicated.

2. A radio frequency identification tag comprising:
an antenna including a conductor pattern in a form of dipole, and connected to an integrated circuit chip of the radio frequency identification tag;
one adjusting portion including an adjusting pattern having only an inductance component corresponding to a length of the adjusting pattern, and connected to the integrated circuit chip in parallel with the antenna; and
a marking portion at which instructions for an adjusting operation using the adjusting portion are indicated, wherein
inductance of the antenna is changed by changing the length of the adjusting pattern wherein changing the inductance of the antenna adjusts an imaginary portion of an impedance of the antenna.

3. The radio frequency identification tag according to claim 2, wherein the conductor pattern includes a meander pattern.

4. The radio frequency identification tag according to claim 2, wherein
the conductor pattern has a shape extending from the integrated circuit chip as substantially a center,
the adjusting portion includes a slit formed inside the conductor pattern along the length of the conductor pattern, and
the inductance is changed by changing a length of the slit.

5. The radio frequency identification tag according to claim 2, wherein the marking portion is arranged beside the adjusting pattern and includes at least one mark indicative of a frequency at which the radio frequency identification tag is used.

6. The radio frequency identification tag according to claim 2, wherein the marking portion is arranged beside the adjusting pattern, and includes at least one mark indicative of an area corresponding to a frequency at which the radio frequency identification tag is used.

7. The radio frequency identification tag according to claim 2, wherein the marking portion is arranged beside the adjusting pattern, and includes at least one mark indicative of a country corresponding to a frequency at which the radio frequency identification tag is used.

8. The radio frequency identification tag according to claim 2, wherein the marking portion is arranged beside the adjusting pattern, and includes at least one mark indicative of a material of an object to which the radio frequency identification tag is attached.

9. The radio frequency identification tag according to claim 2, wherein the marking portion is arranged beside the adjusting pattern, and includes at least one mark indicative of a device name of a reader/writer for the radio frequency identification tag.

10. The radio frequency identification tag according to claim 2, wherein
the marking portion includes at least one simple mark arranged beside the adjusting pattern, and
details of the adjusting operation corresponding to the simple mark are indicated at a portion distant from the simple mark.

11. The radio frequency identification tag according to claim 10, wherein the details are described in an instruction manual of the radio frequency identification tag.

12. A radio frequency identification tag comprising:
an antenna including a conductor pattern in a form of dipole, and connected to an integrated circuit chip of the radio frequency identification tag;

a first adjusting portion including a plurality of folding points at which the conductor pattern is folded;

a second adjusting portion including an adjusting pattern having an inductance component corresponding to a length of the adjusting pattern, and connected to the integrated circuit chip in parallel with the antenna;

a first marking portion at which instructions for an adjusting operation using the first adjusting portion are indicated; and a second marking portion at which instructions for an adjusting operation using the second adjusting portion are indicated, wherein gain of the antenna is changed by changing the folding points, and inductance of the antenna is changed by changing the length of the adjusting pattern, wherein changing the inductance of the antenna adjusts an imaginary portion of an impedance of the antenna.

* * * * *